United States Patent [19]

Hänsel et al.

[11] Patent Number: 5,407,517
[45] Date of Patent: Apr. 18, 1995

[54] HOTMELT BONDING PROCESS

[75] Inventors: Eduard Hänsel, Wuppertal; Walter Meckel, Neuss; Klaus König; Otto Ganster, both of Odenthal; Horst Stepanski, Leverkusen, all of Germany

[73] Assignee: Bayer Aktiengesellschaft, Leverkusen, Germany

[21] Appl. No.: 669,829

[22] Filed: Mar. 15, 1991

[30] Foreign Application Priority Data

Mar. 23, 1990 [DE] Germany .......................... 40 09 311.5
May 24, 1990 [DE] Germany .......................... 40 16 717.8

[51] Int. Cl.$^6$ ................................................ C09J 4/00
[52] U.S. Cl. ........................... 156/331.7; 156/331.4; 427/208.2; 427/422; 525/440; 528/59; 528/83
[58] Field of Search ................. 156/331.4, 331.7; 427/208.2, 422; 528/59, 83; 525/440

[56] References Cited

U.S. PATENT DOCUMENTS

| | | | |
|---|---|---|---|
| 3,911,173 | 10/1975 | Sprague | 427/256 |
| 4,808,255 | 2/1989 | Markevka . | |
| 5,019,638 | 5/1991 | Müller et al. | 528/83 |

FOREIGN PATENT DOCUMENTS

| | | | |
|---|---|---|---|
| 289945 | 11/1988 | European Pat. Off. . | |
| 0331215 | 9/1989 | European Pat. Off. | 156/331.4 |
| 340906 | 11/1989 | European Pat. Off. . | |
| 354527 | 2/1990 | European Pat. Off. . | |
| 421154 | 4/1991 | European Pat. Off. . | |
| 62-043479 | 2/1987 | Japan . | |
| 1081705 | 8/1967 | United Kingdom | 156/331.7 |
| 1540634 | 2/1979 | United Kingdom . | |

*Primary Examiner*—John J. Gallagher
*Attorney, Agent, or Firm*—Joseph C. Gil; Richard E. L. Henderson; Godfried R. Akorli

[57] ABSTRACT

The invention relates to a process for bonding surfaces with isocyanate-containing prepolymers having an isocyanate group content of less than 1.8% by weight, based on the prepolymer, and an average molecular weight $MW_n$ of at least 4,500 in which (a) the prepolymers are prepared by the reaction of (i) polyester diols prepared from dodecanedioic acid and even-numbered alkane diols containing at least 6 carbon atoms and (ii) diisocyanates; (b) the prepolymer is applied as a hotmelt adhesive at a temperature of 80 to 160° C. by spin-spraying onto at least one surface to be bonded; and (c) the treated surface is brought into intimate contact with a second surface to be bonded.

10 Claims, No Drawings

HOTMELT BONDING PROCESS

BACKGROUND OF THE INVENTION

This invention relates to a new process for bonding surfaces using novel hotmelt adhesive compositions.

Bonding processes using solventless adhesive systems containing 100% solids are currently acquiring increasing significance, in part because the use of solvent-based systems requires expensive solvent-recovery plants. Moreover, the use of water-based dispersion or solution systems requires the evaporation of the water, which can also be very expensive. An alternative is the use of hotmelt adhesives, which have been known for some time. An advantage of hotmelt adhesives is that, after application in the form of hot melts, they quickly solidify on cooling and hence strengthen. One disadvantage of hotmelts is related to their high melting temperatures. In particular, temperature-sensitive substrates are difficult to bond because the adhesive layer, unless it is further processed immediately, rapidly crystallizes into a state no longer having a wetting effect and which can only be thermally activated under extreme temperature conditions. In addition, the bond shows limited heat resistance because of the thermoplastic character of the hotmelt.

German Patentschrift 878,827 describes a bonding process in which an ester containing isocyanate groups dissolved in methylene chloride is applied to a surface and the coating is stored so that chain extension can take place. After the surface is then fitted to the other surface to be bonded, a highly elastic bond is established after application of light pressure and storage above 30° C. Instead of using a dissolved hotmelt, it is also possible according to this patent to use solvent-free conditions.

A solvent-free hotmelt bonding process is specifically claimed in German Offenlegungsschrift 2,609,266, which describes a bonding process using reactive hotmelt systems based on isocyanate-containing prepolymers of diisocyanates and polyester diols having melting ranges above 40° C. In view of their low molecular weights, the products are liquid, and thus can be processed, at temperatures just above the melting range of the polyesters. After a chain-extending reaction on the substrate, such liquids reach a sufficiently high molecular weight that, together with the recrystallization of the crystalline soft segments, provides increased initial strength. The final strength is achieved by complete reaction of the residual free isocyanate groups, for example, with atmospheric moisture, to form linear high molecular weight polyurethane polyureas. In view of the very fast cycle times typically encountered in industry, however, the necessary pre-extension of the isocyanate-containing prepolymers is difficult to reproduce and, if insufficiently complete, results in defective bonding caused by inadequate cohesive strength. If, on the other hand, pre-extension proceeds too far, the resultant adhesive layer can no longer be sufficiently activated because of an excessively high molecular weight.

Another method of producing reactive hotmelts is described in European Patent Application 340,906. However, the use of two polyesters having different glass transition temperatures makes the products expensive to produce and the viscosities of the products are relatively high because of the relatively high glass temperatures. Accordingly, the method requires a relatively high processing temperature for thorough wetting of the substrates. In addition, measured application of the hotmelts is problematical.

European Patent Application 354,527 describes hotmelts based on crystalline polyesters and polyisocyanates but does not mention suitable methods for their application.

Although the molten adhesive can be applied by rollers, the reactivity of the isocyanate groups with atmospheric moisture gradually leads to caking that is extremely difficult to remove, particularly where the machines have been in operation for prolonged periods.

Spraying processes are far more suitable, enabling the molten isocyanate-reactive hotmelts to be handled in the absence of moisture. Atmospheric moisture has access to the hotmelt only after it has been applied to the surface to be bonded. The adhesives, however, must satisfy certain rheological requirements to obtain a satisfactory spray pattern.

Accordingly, there exists a need for a bonding process that can be readily carried out on an industrial scale and allows a fast machine cycle time, even under adverse conditions, but nevertheless can be carried out with relatively low-melting adhesives capable of activation at moderate temperatures.

SUMMARY OF THE INVENTION

The present invention relates to a process for bonding surfaces with isocyanate-containing prepolymers based on polyester diols and diisocyanates, comprising (a) preparing an isocyanate-containing prepolymer having an isocyanate group content of less than 1.8% by weight, based on the prepolymer as a whole, and an average molecular weight $MW_n$ of at least 4,500, by reacting
  (i) at least one polyester diol prepared from dodecanedioic acid (i.e., $HOOC-(CH_2)_{10}-COOH$) and at least one even-numbered alkane diol containing at least 6 carbon atoms, and
  (ii) at least one diisocyanate;

(b) applying said prepolymer as a hotmelt adhesive at a temperature of 80° to 160° C. by spin-spraying onto at least one surface to be bonded; and (c) bringing said surface into intimate contact with a second surface to be bonded to establish the bond.

DETAILED DESCRIPTION OF THE INVENTION

The term "spin-spraying" refers to a process in which the filament-like adhesive issuing from an application nozzle is placed into a spiral motion by controlled twirling, preferably using compressed air. The adhesive is thus applied spirally with uniform filament thickness and adjustable loop density.

Surprisingly, adhesives of the present invention can be sprayed in a mat-like pattern and can readily be thermally activated if the time interval between application and activation is not too long. Of particular advantage when using the adhesives according to the invention is the ability to achieve a high machine cycle time because the bonds have a high initial strength.

Suitable even-numbered alkane diols used for the preparation of the polyester diols according to the invention are alkane diols having at least six (and preferably 6 to 12) carbon atoms and, in addition, only even numbers of carbon atoms. A preferred diol is dodecanediol and a more preferred diol is 1,6-hexanediol. The molecular weight of the dihydroxy polyester is generally in the range from about 1,500 to about 8,000 and is preferably in the range from 4,000 to 6,000.

The ratio of isocyanate-reactive groups in the polyol components to the isocyanate groups in the diisocyanates may be varied within wide limits. Generally, the ratio of isocyanate groups to isocyanate-reactive groups should be between about 2.8:1 and about 1.2:1 and is preferably between 2.1:1 and 1.4:1. However, the content of free isocyanate groups, based on the total quantity of reaction components, must be below 1.8% by weight. For example, if the molecular weight of the polyester is approximately 2,000, then the ratio of the isocyanate groups of the polyisocyanate to the hydroxyl groups of the polyester should be approximately 1.5:1, whereas if the polyester has a molecular weight of 5,500, then the ratio may be approximately 2.3:1.

The polyesters are conventionally prepared by melt condensation of the dicarboxylic acids with an excess of the diol component at temperatures in the range from about 180° to about 280° C. Catalysts or entraining agents, such as toluene, may, of course, also be used. The polyesters may, of course, also be prepared by transesterification of dicarboxylic acid esters, for example, with 1,6-hexanediol.

Low molecular weight diols, such as di-, tri- and/or tetraethylene glycol, 1,4-dimethylolcyclohexane; or reaction products of 4,4'-hydroxyphenylpropane with ethylene and/or propylene oxide; or, for special effects, even diols containing ions and/or units containing ionic groups, such as dimethylolpropionic acid, N-methyldiethanolamine, and/or reaction products of sodium bisulfite and propoxylated 1,4-butenediol, may also be used in small quantities. If a certain degree of branching is required, trifunctional polyols, such as trimethylolpropane, may be used in small quantities.

Suitable diisocyanates for the preparation of the prepolymers are any substantially difunctional polyisocyanates. Example of suitable diisocyanates include hexamethylene diisocyanate, 4,4'-dicyclohexylmethane diisocyanates, toluene diisocyanates, diphenylmethane diisocyanates, and/or even methyl-substituted diphenylmethane diisocyanates. The preferred diisocyanate is 4,4'-diphenylmethane diisocyanate containing up to 80% 2,4'-diphenylmethane diisocyanate.

It is also possible to use polyfunctional aliphatic isocyanates obtained, for example, by trimerization or biuretization of hexamethylene diisocyanate in quantities of 0.1 to 5% by weight based on the amount of hotmelt.

The hotmelt systems containing isocyanate groups are prepared, for example, by first mixing the liquid polyols and mixing the resultant mixture with an excess of the isocyanates and finally draining off the homogeneous mixture or stirring until the NCO content is constant, followed by draining off the mixture. The reaction temperature is in the range from about 70° to about 150° C. and preferably in the range from 80° to 110° C. The reactive hotmelts may, of course, also be continuously prepared in a cascade of stirred tanks or in suitable mixing units, such as high-speed mixers operating on the rotor-stator principle.

The polyesters can be completely or partly modified with less than equivalent amount of diisocyanates, preferably hexamethylene diisocyanate. Upon completion of the reaction, the polyester diols containing urethane groups, optionally together with additional polyesters that are free of urethane groups, may then be allowed to react with an excess of diisocyanates to form a hotmelt containing isocyanate groups.

If stored in the absence of moisture at room temperature or up to about 50° C., the hotmelt systems may be stored almost indefinitely.

The hotmelt systems may be modified with fillers, such as chalk, heavy spar, or polymer powders (for example PVC or ABS powder), dyes, resins, and/or extender oils, and represent excellent adhesives.

The hotmelt systems are applied at elevated temperature, either continuously or discontinuously, at temperatures of about 80° to about 160° C.

The hotmelts are applied according to the invention to at least one of the surfaces to be bonded by spinning the hotmelt with a hot air stream. Suitable machines are commercially available. A machine that can be used on an industrial scale is marketed, for example, by the Nordson Company. With machines of this type, the hotmelts can be applied under control, with clearly defined edges and with high surface coverage. The adhesive is preferably applied in a quantity of about 15 to about 100 g/m$^2$ and more preferably in a quantity of 30 to 50 g/m$^2$.

By virtue of the rapid crystallization of the hotmelts of the invention, adhesive-coated parts can be stacked for a short time without sticking together. However, the time interval between application of the adhesive and bonding should not be too long because otherwise activation problems could arise. Suitable time intervals are between about 3 and 5 hours and depend upon the external conditions, such as temperature and atmospheric moisture. Because this temporary storage is not necessary, however, the adhesives according to the invention are distinguished from those described in the prior art (for example, in German Offenlegungsschrift 2,609,266) in which temporary storage is essential for a further increase in molecular weight. Accordingly, particular preference is attributed to a continuous process in which, after the hotmelt is applied by spin-spraying to one of the surfaces to be bonded, the treated surface is fitted to another adhesive-free surface (that can optionally be preheated) and the finished article is formed by bonding under pressure, optionally with shaping.

Setting presumably initial takes place physically by recrystallization of the polyester segments and subsequently or simultaneously by chemical reaction of the isocyanate groups with moisture or other Zerewitinoff-active groups. The moisture in the substrate and in the atmosphere is normally sufficient for setting, although the reaction can, of course, be accelerated by additional spraying with water or glycols and/or catalyst-containing media.

The products according to the invention can be used as adhesives for bonding various materials, such as wood, wood-containing products, glass, ceramics, leather, or plastics in solid form or in foamed form (such as PVC, PUR, ABS, polyethylene, or polypropylene), to materials of the same kind or to materials of a different kind. The adhesives can be used for various applications, for example, as an assembly adhesive for the temporary fixation of components; as a bookbinding adhesive, in which an early increase in strength is achieved through the rapid crystallization, allowing a fast cycle time in conventional bookbinding machines; or for the efficient preparation of bonds covering a wide surface area that immediately after bonding are subjected to severe stressing and thus require an adhesive which rapidly achieves high initial strength, such as in the bonding of shoe soles, in the manufacture of furniture, or in the production of parcel shelves or other interior parts of motor vehicles.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Polyester polyols

A-1 Hydroxylpolyester of dodecanedioic acid and 1,6-hexanediol MW[1] 4,400, hydroxyl value 25.3, S.p.[2] 73° C.

A-2 Hydroxylpolyester of dodecanedioic acid and dodecanediol MW 4,800, hydroxyl value 23.4, S.p. 83° C.

A-3 Hydroxylpolyester of dodecanedioic acid and 1,6-hexanediol MW 1,950, hydroxyl value 57.5, S.p. 73° C.

A-4 Hydroxylpolyester of 2 mol of polyester A-3 and 1 mol of diisocyanate C-2 MW 4,070, hydroxyl value 27.5, S.p. 73° C.

A-5 Hydroxylpolyester of adipic acid and 1,6-hexanediol MW 4,070, hydroxyl value 27.4, S.p. 57° C.

A-6 Hydroxylpolyester of sebacic acid and 1,4-butanediol MW 1,970, hydroxyl value 57.1, S.p. 64° C.

(1) MW represents molecular weight
(2) S.p. represents the softening point as measured with a DuPont 910 differential scanning calorimeter (heating rate 5° C./min.)

Diisocyanates

C-1 4,4'-Diisocyanatodiphenylmethane
C-2 Hexamethylene diisocyanate
C-3 Trimerized hexamethylene diisocyanate, NCO value 22.5%

Preparation of the prepolymers

The molten polyester polyols were mixed (where appropriate) and dehydrated with stirring for 60 minutes at 100° C. at a pressure of approx. 20 mm Hg. The diisocyanate was added in the relative quantities indicated in Table 1 at approx. 80°–90° C. and the resultant mixture was stirred under nitrogen until the isocyanate content was constant. The prepolymer was drained into cartridges.

Testing of the hotmelt systems

After storage for two weeks at room temperature, the cartridges were melted for 60 minutes at 130°–140° C. in a heating cabinet.

The isocyanate content of the liquid prepolymer was determined by titration with dibutylamine. Results are given in Table 1.

Using a spray gun (available from Beyer & Otto, Kleinostheim), the hotmelts were applied from the cartridge to 25 mm wide test specimens of Limba plywood (4 mm thick) as a spun mat. A 1.8 mm thick PVC film was clamped in a frame and conditioned for 4 minutes in a recirculating air drying cabinet temperature-controlled to 130° C. The film clamped in the frame was then immediately placed on the cold (room temperature) wood test specimen and pressed for 20 seconds in a pneumatic press temperature-controlled to 35° C. After 1 minute, a 180° peel test was carried out (feed rate 100 mm/min. in accordance with ASTM D 903-49). Test results are given in Table 2.

TABLE 1

| | NCO prepolymers | | | |
|---|---|---|---|---|
| Example | Polyol (g) | Diisocyanate (g) | NCO value (%) | Viscosity at 120° C. (Pa · s) |
| 1 | 1000 A-1 | 99.4 C-1 | 1.22 | 11.0 |
| 2 | 1000 A-2 | 104.2 C-1 | 1.49 | 13.4 |
| 3 | 1000 A-4 | 116.7 C-1 | 1.60 | 14.0 |
| 4 | 1000 A-1 | 99.4 C-1, 10.0 C-3 | 1.41 | 10.8 |
| 5 | 1000 A-3 | 256.0 C-1 | 3.25 | 6.4 |
| 6 | 1000 A-5 | 122.0 C-1 | 1.75 | 8.5 |
| 7 | 1000 A-6 | 222.0 C-1 | 2.30 | 7.5 |

Examples 1 to 4 correspond to the invention.
Example 7 corresponds to Example 6 of German Offenlegungs-schrift 2,609,266.

TABLE 2

| | Bonding behavior of the NCO prepolymers | |
|---|---|---|
| Example | Spray behavior | Initial strength after 1 minute (N/cm) |
| 1 | clean spun mat | 3 |
| 2 | clean spun mat | 4 |
| 3 | clean spun mat | 4 |
| 4 | clean spun mat | 4 |
| 5* | droplet-like spray pattern | 3 |
| 6 | clean spun mat | no bond |
| 7 | droplet-like spray pattern | no bond |

*Example 5 does not fulfil the rheological conditions for the spin spraying process because of the high NCO-value.

What is claimed is:

1. A process for bonding surfaces with isocyanate-containing prepolymers based on polyester diols and diisocyanates, comprising
   (a) preparing an isocyanate-containing prepolymer having an isocyanate group content of less than 1.8% by weight, based on the prepolymer as a whole, and an average molecular weight $MW_n$ of at least 4,500, by reacting
      (i) at least one polyester diol prepared from dodecanedioic acid and at least one even-numbered alkane diol containing at least 6 carbon atoms, and
      (ii) at least one diisocyanate;
   (b) applying said prepolymer as a hotmelt adhesive at a temperature of 80° to 160° C. by spin-spraying onto at least one surface to be bonded; and
   (c) bringing said surface into intimate contact with a second surface to be bonded to establish the bond.

2. A process according to claim 1 wherein the polyester diol is prepared from dodecanedioic acid and 1,6-hexanediol.

3. A process according to claim 1 wherein the polyester diol is prepared from dodecanedioic acid and dodecanediol.

4. A process according to claim 1 wherein the ratio of isocyanate groups in the diisocyanate to isocyanate-reactive groups in the polyester diol is between 2.1:1 and 1.4:1.

5. A process according to claim 1 wherein the polyester diol has a molecular weight in the range from 1,500 to 8,000.

6. A process according to claim 1 wherein the polyester diol has a molecular weight in the range from 4,000 to 6,000.

7. A process according to claim 1 wherein the diisocyanate is a diphenylmethane diisocyanate.

8. A process according to claim 1 wherein the prepolymer is applied as a hotmelt adhesive by spin-spraying onto each surface to be bonded.

9. A process according to claim 1 wherein a surface to which the prepolymer is applied by spin-spraying is brought into contact under pressure with a second surface to which the prepolymer has not been applied.

10. A process according to claim 9 wherein the surface to which the prepolymer is applied by spin-spraying is brought into contact and shaped under pressure with the second surface.

* * * * *